Patented Nov. 5, 1940

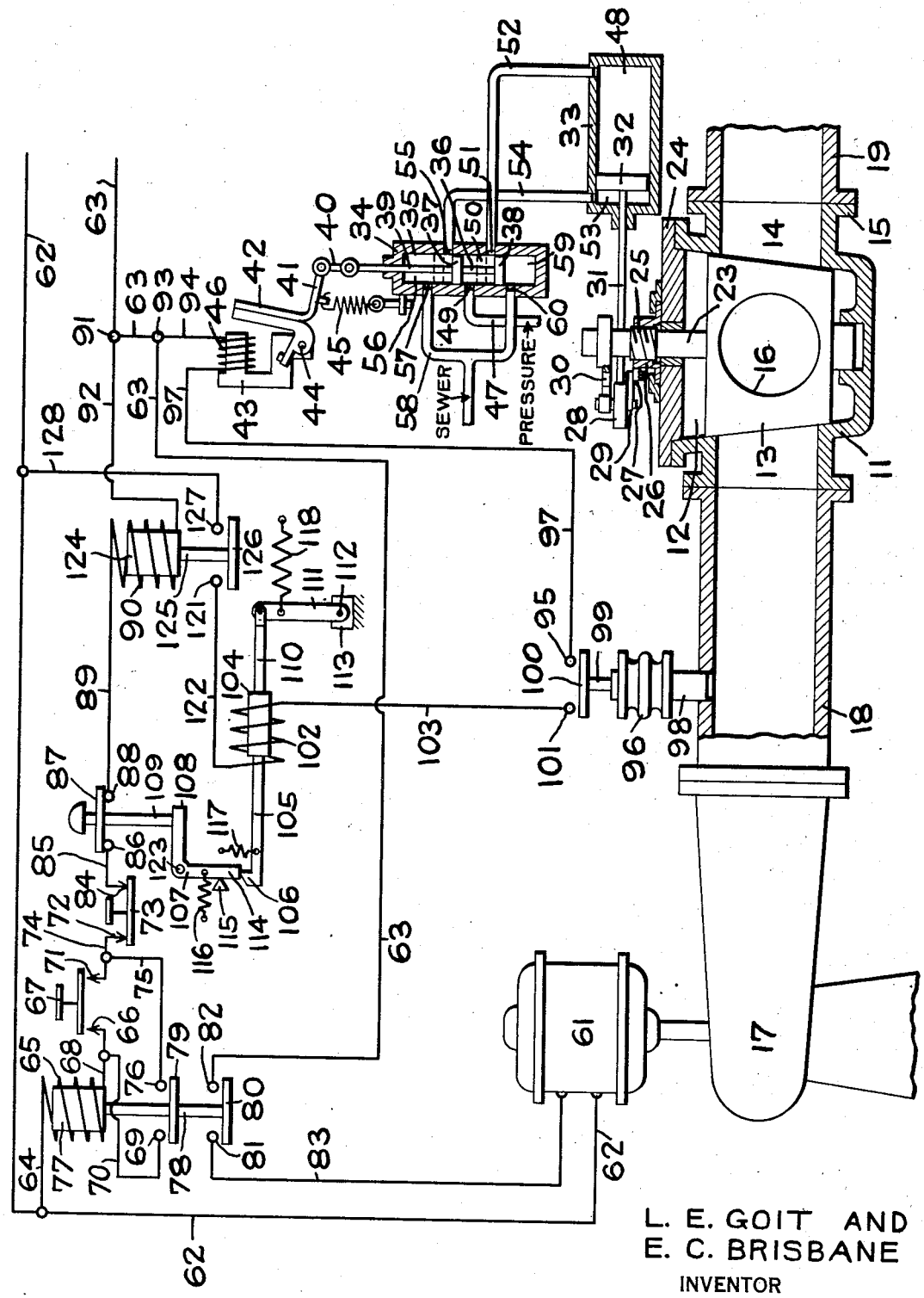
L. E. GOIT AND
E. C. BRISBANE
INVENTOR

2,220,327

UNITED STATES PATENT OFFICE 2,220,327

CONTROL SYSTEM

Laurence E. Goit, Los Angeles, Calif., and Eugene C. Brisbane, York, Pa., assignors to S. Morgan Smith Company, York, Pa., a corporation of Pennsylvania Application November 22, 1939, Serial No. 305,599

12 Claims. (Cl. 103—40)

This invention relates to control systems, and more particularly to control systems adapted to control the operation of power operated tapered plug valves.

An object of the invention is to provide an improved control system for power operated mechanism of a valve installed in a pipe line on the pressure side of a motor driven pump, in which electromagnetically operated means are associated with the circuit supplying current to the pump motor so as to be responsive to line connections for said motor to control the operation of the valve mechanism.

With the foregoing and other objects and advantages in view, the invention consists in the preferred construction and arrangement of the several parts which will be hereinafter fully described and claimed.

In the accompanying drawing, the single figure is a diagrammatic view, partly in section of a control system embodying the present invention.

Referring to the drawing, the improved control mechanism may be used in connection with a tapered plug valve of the type embodying a main body or casing 11, having a cavity 12 formed therein for a tapered plug 13, the cavity 12 being intersected by a waterway or opening 14 which constitutes a passage through the valve. The plug 13 has a passage 16 formed therein so that when the plug 13 is in open position a bore will extend through the valve from end to end. The portion of the valve casing 11 in which the waterway 14 is formed may terminate in flanges 15 by which the valve may be connected to the ends of pipes or conduits in well known manner. In the present instance, one end of the valve 11 is shown connected to the discharge end of a pump 17 by a suitable length of pipe 18 and the other end of the valve is connected to a pipe 19. The pump 17 is adapted to deliver water from a suitable source of supply to the pipe, and the valve 11 may be adapted to control communication through the pipe line from the pump so that when the pump is inactive communication through the pipe line is cut off by the valve, thereby preventing back flow of the water towards the pump.

The valve plug 13 is supported for both axial and rotary movement in the valve body 11, and at its upper or larger end, the plug 13 has fixed thereto a shaft 23 which extends through a cover plate 24 attached to the valve body 11.

The valve shaft 23 is formed with screw threads 25 on which is mounted a lift nut 26 having a lateral extension 27 connected to a reciprocable member 28 by a link 29.

Also connected to the member 28 is the end of a crank arm or rotating lever 30 which is keyed to, or otherwise made rigid with, the valve shaft 23.

When the member 28 is moved rectilinearly in the manner to be hereinafter described, the nut 26 is turned with respect to the shaft 23 thereby effecting axial movement of the valve plug 13 so as to unwedge said plug. Continued movement of the member 28, after the plug 13 has been unwedged, effects operation of the lever 30 whereby said plug is rotated towards open position. At the completion of the rotary movement of the plug 13, through the operation of the lever 30, the nut 26 is again turned on the shaft 23, but in a reverse direction, so as to move the plug 13 axially and wedge the same in the valve body 11.

The member 28 is connected to a rod 31 of a piston 32 mounted in a cylinder 33.

For the purpose of controlling the operation of the piston 32, a suitable control valve device 34 is employed.

The control valve 34 comprises a casing formed with a cylindrical bore 35 in which is mounted a piston valve 36 having a pair of spaced heads 37 and 38.

The piston valve 36 has a stem 39 which extends through the casing of the control valve 34 and is connected by a link 40 to the free end of an arm 41 extending laterally from the armature 42 of a relay 43. The armature 42 is pivoted on a pin 44. Connected at one end to the arm 41 and at the other end to the casing of the control valve 34, is a spring 45 which holds the armature in open position, when no current is passing through the coil 46 of the relay 43.

When the valve plug 13 is in closed position, as shown in the drawing, the piston valve 36 of the control valve 34 will be so positioned that fluid under pressure will be supplied from the pressure supply pipe 47 to piston chamber 48, through port 49, valve chamber 50, port 51, and pipe 52, and piston chamber 53 will be connected to a sewer or free discharge, through pipe 54, port 55, valve chamber 56, port 57, and pipe 58.

When the relay 46 is energized the armature 42 is swung on its pivot 44 thereby shifting the piston valve 36 to the dotted line position illustrated, in which position of the piston valve, piston chamber 48 is connected to the sewer or free discharge pipe 58, through port 51, valve chamber 56, and port 66. At the same time, piston chamber 53 is connected to the pressure supply pipe 47, through pipe 54, port 55, valve chamber 56, and port 49. The piston 32 is then actuated to operate the valve plug mechanism and effect rotation of the plug 13 from closed to open position. The valve plug 13 will remain in open position as long as the relay 46 is energized.

The pump 17 may be operated by an electric motor 61 of any suitable type, said motor being adapted to be supplied with electric current from a suitable source of power supply, such as the lines 62 and 63, under the control of mechanism to be hereinafter more fully described.

As shown, the line 62 may be connected to one terminal of the motor 61, while between the lines 62 and 63 there may be installed various circuit controlling devices.

Connected to the line 62 by a conductor 64, is one end of the solenoid coil of a relay 65. The other end of said coil is connected to a contact point 66 of a push button switch device 67, by a conductor 68, and also to a contact point 69 of the relay, by a conductor 70 joined to the conductor 68.

The other contact point 71 of the push button switch device 67 is connected to a contact point 72 of another push button switch device 73 by a conductor 74, and joined to the conductor 74 is a conductor 75 which is connected to another contact point 76 of the relay 65.

The plunger 77 of the relay 65 has an operating shaft 78 which carries the contact bars 79 and 80, the bar 79 being adapted to connect the contact points 69 and 76 when the relay coil 65 is energized, and the contact bar 80 being adapted to connect the contact points 81 and 82 of said relay.

The contact point 81 is connected to a terminal of the motor 61, by a conductor 83, and the contact point 82 is connected to the power line 63.

The other contact point 84 of the push button switch device 73 is connected by a conductor 85 to a contact point 86 of a switch device 87. The other contact point 88 of the switch 87 is connected by a conductor 89 to one end of the solenoid coil of a relay 90, the other end of said coil being connected by a conductor 92 to the line 63 at the point 91.

One end of the coil 46 is connected to the line 63 at the point 93, by a conductor 94, and the other end of said coil 46 is connected to a contact point 95 of a pressure switch device 96, by a conductor 97.

The pressure switch device 96 has an expansible chamber connected to the pipe 18 by a pipe 98, so that said chamber is subjected to the pressure of the fluid in the pipe 18, in order to actuate a shaft 99 which carries a contact bar 100, to connect the contact points 95 and 101 when the pressure of fluid in the pipe 18 is built up to a predetermined amount in the manner hereinafter described.

The contact point 101 is connected to one end of the coil of a solenoid 102, by a conductor 103, and the other end of said solenoid coil is connected to the contact point 121 of the relay 90, by a conductor 122.

The solenoid 102 has a core 104 loosely mounted therein so as to permit swinging movement of a stem 105 which extends from said core.

The outer end 106 of the stem 105 is adapted to engage one arm 114 of a bell crank lever 107 and operate said lever in the manner to be hereinafter described.

The other arm 108 of the bell crank lever 107 is operatively associated with a stem 109 of the switch 87. The bell crank lever is pivoted for swinging movement about the point 123.

Also extending from the solenoid core 104, but in the opposite direction with respect to the stem 105, is an arm 110, the outer end of which is pivotally connected to one end of a link 111. The other end of the link 111 is pivotally connected as at 112, to a suitable support 113.

The arm 114 of the bell crank lever 107 is normally retained against a stop 115 by a light coil spring 116, and the end 106 of the stem 105 is pulled upwardly by a spring 117. A contractile coil spring 118 of stronger pull than the spring 116, is connected to the link 111.

The plunger 124 of the relay 90 has an operating shaft 125 which carries the contact bar 126. The contact bar 126 is adapted to connect the contact points 121 and 127 when the relay coil 90 is energized, the contact point 127 being connected with the line 62 by a conductor 128.

When the pump 17 is inactive, the valve plug 13 is in closed position as shown, and the control circuit of the pump motor 61 is as illustrated, with the contact bar of the push button switch 73 in engagement with the contact points 72 and 84, and the contact bar of the switch 87 in engagement with the contact points 86 and 88. Since the contact bar of the push button switch 67 is out of engagement with the contact points 66 and 71, the main circuit of the motor 61 will be open.

The switch 67 may be termed "the starter switch," since it is adapted to be actuated first when it is desired to start the pump 17.

The switch 73 is normally retained in closed position, as shown, and is adapted to be actuated when it is desired to shut down the apparatus and close the valve plug 13. The switch 73 may be termed "the valve closing switch," or "the stop switch."

The relay 90 is adapted, when energized, to connect a secondary current supply direct from the lines 62 and 63 for energizing or operating the relay 43 and the solenoid 102.

Since the coil of the relay 65 is deenergized when the apparatus is inactive, the contact bars 79 and 80 will be out of engagement with their respective contact points.

Also, since there is no pressure of fluid in the pipe 18 when the pump 17 is inactive, the contact bar 100 of the pressure switch 96 will be disconnected from the contact points 95 and 101.

When it is desired to start the pump 17, the push button switch device 67 is operated to close the circuit by which the relay 65 is energized. With the solenoid coil of said relay energized, the plunger 77 will be pulled upwardly so that the contact bar 79 connects the contact points 69 and 76, and the contact bar 80 connects the contact points 81 and 82.

The contact bar 79 provides a holding circuit for retaining the solenoid coil of the relay 65 energized when the push button 67 is released.

The other contact bar 80 closes the circuit through the motor 61 from the line 62 to the line 63, so that the motor is energized and operates the pump 17 in well known manner.

When the pump 17 is thus initially started, the valve plug 13 will remain closed until the pressure of fluid in the pipe 18 has increased a predetermined amount in order to permit the pump motor 61 to attain its normal operating speed.

After the pump has thus been operated for a predetermined length of time, fluid pressure in the pipe 18 is built up sufficiently to actuate the pressure switch 96 so that the contact bar 100 connects the contact points 95 and 101 to close the circuit from the power line 62 through conductor 128, contacts 127, 126 and 121, conductor 122, solenoid coil 102, conductor 103, contacts 101, 100 and 95, conductor 97, coil 46, and conductor 94 to the other power line 63, thereby energizing the coils 46 and 102.

When the solenoid coil 102 is energized, the core 104, together with the stem 105 and the arm 110, will be moved towards the left, thereby positioning the end 106 of the stem 105 in engagement with the left-hand side wall of the arm 114 of the bell crank lever 107.

When the coil 46 of the relay 43 is energized in the manner hereinbefore described, the armature 42 will be actuated to operate the pilot valve 34 with the result that the valve plug 13 is operated by the piston 32 and associated mechanism and rotated to open position.

In this way communication through the pipe line leading from the pump 17 will be established, and this communication will remain open until it is desired to shut down the apparatus.

When it is desired to shut down the pump 17, the push button switch 73 may be actuated, and this breaks the holding circuit of the relay 65, thereby opening the circuits to the motor 61.

When the switch 73 opens the circuit, electric current is shut off through the relay 90, so that the coils 46 and 102 are deenergized.

When the coil 102 is deenergized, the spring 118 pulls the stem 105 towards the right, with the result that the latch provided by the end 106 of said stem moves the bell crank lever arm 114 also towards the right so that the stem 109 of the switch 87 is moved upwardly by the bell crank lever arm 108, thereby disconnecting the contact bar of the switch 87 from the contact points 86 and 88.

When the relay coil 46 is deenergized, the armature 42 returns to the position shown in the drawing, so that the valve plug 13 is operated by the piston 32 and associated mechanism and returned to closed position.

If, during operation of the pump 17, pressure in the pipe line should fall below a predetermined amount the pressure switch 96 will be actuated and open the secondary current supply circuit thereby deenergizing the coils 46 and 102. When the coil 46 is deenergized, the pilot valve 34 will be operated in the above described manner to effect closing of the valve plug 13, and at the same time, the spring 118 will move the core 104 of the solenoid 102, thereby actuating the switch 87 to open the holding circuit of the relay 65. In this way the main circuit of the motor 61 is opened so that the motor ceases to operate the pump 17.

Having thus described our invention, what we claim is:

1. The combination with a pipe line and a pump for delivering fluid thereto, of a valve for controlling communication through said pipe line, mechanism for actuating said valve, a driving motor for said pump, a line switch mechanism for connecting said motor to a source of supply and having electromagnetically operated means associated therewith for holding the same in closed position, and an electromagnetic device responsive upon establishment of line connections for said motor to control the operation of said valve mechanism.

2. In a control system, the combination with a pipe line, a pump for delivering fluid to said pipe line, an electric motor for operating said pump, a line switch for connecting said motor to a source of supply, electromagnetically operated switch means for holding the motor circuit closed, a valve for controlling communication through the pipe line, mechanism for operating the valve and including a fluid pressure operated piston, a pilot valve for controlling the operating fluid to said piston, an electromagnetic device having a relay responsive upon establishment of line connections for said motor and an armature pivotally mounted for movement toward said relay when the relay is energized, and an arm extending from said armature and operatively connected to said pilot valve for operating the same to effect an opening movement of said valve mechanism when said relay is energized.

3. In a control system, the combination with a pipe line, a pump for delivering fluid to said pipe line, an electric motor for operating said pump, a line switch mechanism for connecting said motor to a source of supply and having electromagnetically operated means associated therewith for holding the same in closed position, a valve for controlling communication through the pipe line, mechanism for operating the valve and including a fluid pressure operated piston, a pilot valve for controlling the operating fluid to said piston, an electromagnet having a relay coil responsive upon establishment of line connections for said motor and an armature pivotally mounted for movement toward said relay when the relay is energized, and an arm extending from said armature and operatively connected to said pilot valve for operating the same to effect an opening movement of said valve mechanism when the relay coil is energized.

4. In a control system, the combination with a pipe line, a pump for delivering fluid to said pipe line, an electric motor for operating said pump, a line switch mechanism for connecting said motor to a source of supply and having electromagnetically operated means associated therewith for holding the same in closed position, a valve for controlling communication through the pipe line, mechanism for operating the valve and including a fluid pressure operated piston, a control valve for controlling the operating fluid to said piston, an electromagnet having a relay coil and an armature pivotally mounted for movement toward said relay when the relay is energized, an arm extending from said armature and operatively connected to said control valve for operating the same, and switch mechanism operable independently of said line switch mechanism for controlling the line connections of said electromagnet with the motor circuit.

5. In a control system, the combination with a pipe line, a pump for delivering fluid to said pipe line, an electric motor for operating said pump, a line switch mechanism for connecting said motor to a source of supply and having electromagnetically operated means associated therewith for holding the same in closed position, a valve for controlling communication through the pipe line, mechanism for operating the valve and including a fluid pressure operated piston, a control valve for controlling the operating fluid to said piston, an electromagnet having a relay coil and an armature pivotally mounted for movement toward said relay when the relay is energized, an arm extending from said armature and operatively connected to said control valve for operating the same, means for controlling the line connections of said electromagnet with the motor circuit, and switch mechanism operable independently of said line switch mechanism for disconnecting the line connections of said motor to the source of supply.

6. The combination with a pipe line and a pump for delivering fluid thereto, of a valve for controlling communication through said pipe, mechanism for actuating said valve, a motor for operating said pump, a line switch mechanism for connecting said motor to a source of supply, means responsive upon establishment of line connections for said motor to control the operation of said valve mechanism, and switch mechanism operable independently of said line switch mechanism for disconnecting the line connections of said motor to the source of supply.

7. The combination with a pipe line and a pump for delivering fluid thereto, of a valve for controlling communication through said pipe, mechanism for actuating said valve, a motor for operating said pump, a line switch for connecting said motor to a source of supply, control means responsive upon establishment of line connections for said motor to effect operation of said valve mechanism to open the valve, and switch means operable independently of said line switch for disconnecting the line connections of said motor to the source of supply, said valve control means being responsive when the line connections of said motor are disconnected to effect operation of said valve mechanism to close the valve.

8. The combination with a pipe line and a pump for delivering fluid thereto, of a valve for controlling communication through said pipe, mechanism for actuating said valve, a motor for operating said pump, a line switch for connecting said motor to a source of supply, electromagnetically operated means responsive upon establishment of line connections for said motor to effect operation of said valve mechanism to open the valve, and switch means operable independently of said line switch for disconnecting the line connections of said motor to the source of supply, said electromagnetically operated means being responsive when the line connections of said motor to the source of supply are disconnected to effect operation of said valve mechanism to close the valve.

9. The combination with a pipe line and a pump for delivering fluid thereto, of a valve for controlling communication through said pipe line, mechanism for actuating the valve, a driving motor for said pump, a line switch mechanism for connecting said motor to a source of supply and having electromagnetically operated means associated therewith for holding the same in closed position, control means responsive upon establishment of line connections for said motor to effect operation of said valve mechanism to open the valve, and switch means operable independently of said line switch for disconnecting the line connections of said motor to the source of supply, said control means being responsive when the line connections of said motor to the source of supply are disconnected to effect operation of said valve mechanism to close the valve.

10. The combination with a pipe line and a pump for delivering fluid thereto, of a valve for controlling communication through said pipe, mechanism for actuating the valve, a driving motor for said pump, a line switch mechanism for connecting said motor to a source of supply and having electromagnetically operated means associated therewith for holding the same in closed position, electromagnetically operated control means to effect operation of said valve mechanism, and a relay responsive upon establishment of line connections for said motor to effect operation of said control means.

11. In a control system, the combination with a pipe line and a pump for delivering fluid thereto, of a valve for controlling communication through said pipe line, mechanism for actuating the valve and including a fluid pressure operated piston, a pilot valve for controlling the operating fluid to said piston, an electromagnet having a relay coil and an armature pivotally mounted for movement toward said relay when the relay is energized, an arm extending from said armature and operatively connected to said pilot valve for operating the same to effect an opening movement of said valve mechanism when the relay coil is energized, a driving motor for said pump, a line switch mechanism for connecting said motor to a source of supply and having electromagnetically operated means associated therewith for holding the same in closed position, a switch for closing a circuit for operating said electromagnetically operated means to establish line connections for said motor, a second relay responsive upon establishment of line connections for said motor to connect the relay of said electromagnet with a source of supply of current to effect operation of said armature to effect operation of said valve mechanism to open the valve, and switch means operable independently of the first switch for disconnecting the line connections of said motor to the source of supply, said second relay being responsive when the line connections of said motor to the source of supply are disconnected to deenergize said electromagnet and thereby effect operation of said pilot valve so as to actuate the valve mechanism to close the valve.

12. The combination with a pipe line and a pump for delivering fluid thereto, of a valve for controlling communication through said pipe line, mechanism for actuating the valve, a driving motor for said pump, a line switch mechanism for connecting said motor to a source of supply and having electromagnetically operated means associated therewith for holding the same in closed position, control means to effect operation of said valve mechanism, a switch for operating said electromagnetically operated means to establish line connections for said motor, a relay responsive upon establishment of line connections for said motor to effect operation of said control means to effect operation of said valve mechanism to open the valve, and switch means operable independently of the first switch for disconnecting the line connections of said motor to the source of supply, said control means being responsive when the line connections of said motor to the source of supply are disconnected to effect operation of said valve mechanism to close the valve.

LAURANCE E. GOIT.
EUGENE C. BRISBANE.